(12) United States Patent
Credo et al.

(10) Patent No.: US 11,241,934 B2
(45) Date of Patent: Feb. 8, 2022

(54) TECHNIQUES TO OPTIMIZE VEHICULAR SYSTEMS FOR OCCUPANT PRESENCE AND CONDITION

(71) Applicant: Intel Corporation, Santa Clara, CA (US)

(72) Inventors: Grace Credo, San Mateo, CA (US); Joelle Alcaidinho, Santa Clara, CA (US); Wael Guibene, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 183 days.

(21) Appl. No.: 16/236,142

(22) Filed: Dec. 28, 2018

(65) Prior Publication Data

US 2019/0381860 A1  Dec. 19, 2019

(51) Int. Cl.
*B60H 1/00* (2006.01)
*H04L 12/40* (2006.01)
(Continued)

(52) U.S. Cl.
CPC ..... *B60H 1/00792* (2013.01); *B60H 1/00742* (2013.01); *B60H 1/00785* (2013.01);
(Continued)

(58) Field of Classification Search
CPC ............ B60H 1/00792; B60H 1/00742; B60H 1/00785; B60H 1/00828; B60H 1/00871; B60Q 9/00; B60Q 3/80; B60N 2/002; B60N 2/58; B60N 2/60; B60R 2022/4858; B60R 16/0231; B60R 22/48; G08B 5/00;
(Continued)

(56) References Cited

U.S. PATENT DOCUMENTS

| | | | |
|---|---|---|---|
| 3,954,100 A * | 5/1976 | Sem-Jacobsen | A61B 5/282 600/393 |
| 6,507,779 B2 * | 1/2003 | Breed | B60N 2/002 280/734 |

(Continued)

FOREIGN PATENT DOCUMENTS

| | | |
|---|---|---|
| JP | 2000-142081 A1 | 5/2000 |
| JP | 2008-213634 A | 9/2008 |

(Continued)

OTHER PUBLICATIONS

Identification of Suitable Biomarkers (Year: 2020).*

(Continued)

*Primary Examiner* — Jeff A Burke
*Assistant Examiner* — Kyle T Johnson
(74) *Attorney, Agent, or Firm* — Spectrum IP Law Group LLC

(57) ABSTRACT

Methods and apparatus relating to optimization of vehicular systems for occupant presence and condition are described. In one embodiment, logic circuitry detects presence and/or condition of one or more occupants of a vehicle based on sensor data. Memory (e.g., non-volatile memory) stores information corresponding to one or more functions of the vehicle. The logic circuitry transmits a request to the vehicle to cause an adjustment to the one or more functions of the vehicle. Other embodiments are also disclosed and claimed.

18 Claims, 12 Drawing Sheets

(51) Int. Cl.
| | |
|---|---|
| *B60Q 9/00* | (2006.01) |
| *B60N 2/00* | (2006.01) |
| *G08B 21/22* | (2006.01) |
| *B60R 22/48* | (2006.01) |
| *B60N 2/58* | (2006.01) |
| *B60R 16/023* | (2006.01) |
| *G08B 5/00* | (2006.01) |

(52) U.S. Cl.
CPC ..... *B60H 1/00828* (2013.01); *B60H 1/00871* (2013.01); *B60N 2/002* (2013.01); *B60Q 9/00* (2013.01); *G08B 5/00* (2013.01); *G08B 21/22* (2013.01); *H04L 12/40* (2013.01); *B60N 2/58* (2013.01); *B60R 16/0231* (2013.01); *B60R 22/48* (2013.01); *B60R 2022/4858* (2013.01); *H04L 2012/40215* (2013.01); *H04L 2012/40273* (2013.01)

(58) Field of Classification Search
CPC .................. G08B 21/22; H04L 12/40; H04L 2012/40215; H04L 2012/40273
See application file for complete search history.

(56) References Cited

U.S. PATENT DOCUMENTS

| | | | | |
|---|---|---|---|---|
| 7,362,225 | B2* | 4/2008 | Rittmueller | B60N 2/002 324/207.15 |
| 8,235,416 | B2* | 8/2012 | Breed | B60N 2/853 280/735 |
| 9,227,484 | B1* | 1/2016 | Justice | B60H 1/00742 |
| 10,112,505 | B2* | 10/2018 | Tanriover | B60R 21/01512 |
| 2002/0104367 | A1* | 8/2002 | Lich | B60R 16/037 73/1.13 |
| 2007/0057781 | A1* | 3/2007 | Breed | H01Q 1/3233 340/457.1 |
| 2008/0171914 | A1* | 7/2008 | Ouwerkerk | A61B 5/486 600/300 |
| 2012/0232749 | A1* | 9/2012 | Schoenberg | B60N 2/28 701/36 |
| 2015/0301603 | A1* | 10/2015 | Maggiali | G06F 3/0443 345/174 |
| 2018/0027987 | A1* | 2/2018 | Calhoun | A47C 7/622 |
| 2019/0175114 | A1* | 6/2019 | Gallagher | A61B 5/0205 |
| 2019/0381860 | A1* | 12/2019 | Credo | B60H 1/00785 |
| 2020/0094713 | A1* | 3/2020 | Salmu | B60N 2/7017 |

FOREIGN PATENT DOCUMENTS

| | | |
|---|---|---|
| KR | 10-1870916 B1 | 7/2018 |
| WO | 2017-105486 A1 | 6/2017 |
| WO | 2020139502 A1 | 7/2020 |

OTHER PUBLICATIONS

SOAK The Sweat Sensitive Textile (Year: 2016).*

"Noggle Extend Your Air Condition or Heat to Your Kids Instantly" product ad, retrieved on Sep. 18, 2018, 8 pages, Amazon, retrieved from https://www.amazon.com/Conditioning-Instantly-Children-Comfortable-Traveling/dp/B00LXT23RU?th=1.

"Rumbi Baby Backseat Protector for Any Car, Truck and SUV" product ad, retrieved on Sep. 18, 2018, 10 pages, Amazon, retrieved from https://amazon.com/Bench-Protector-Seatbelts-Removable-Zipper/dp/B00X4YLD6E/ref=sr_1_5_a_it?ie=UTF8&qid=1525474019&sr=8-5&keyw.

"Dog Seat Cover for Any Size Car, Truck and SUV" product ad, retrieved on Dec. 17, 2018, 10 pages, Amazon, retrieved from https://www.amazon.com/Parachute-Protector-Seatbelts-Removable-Zipper/dp/B00X4YNV8W/ref=sr_1_1?ie=UTF8&qid=1545103155&sr=8-1-spons.

Kauffman, "Hot Car Safety for Dogs: 8 Tips" Internet Magazine Article, retrieved Dec. 21, 2018, 5 pages, Dogster Magazine, retrieved from https://www.dogster.com/lifestyle/hot-car-safety-for-dogs-tips.

Fratt, "How to Keep Your Dog Cool in the Car on Cross-Country Adventures!" Internet Magazine Article, retrieved Dec. 21, 2018, 12 pages, K9 of Mine, retrieved from https://www.k9ofmine.com/keep-dog-cool-in-car/.

Curtis, "Nissan Encourages You to Drink and Drive With New Sweat-Sensing Car Seats" Newspaper Internet article, Oct. 3, 2017, 16 pages, Daily Mirror, retrieved from https://www.mirror.co.uk/tech/nissan-encourages-drinking-driving-new-11279159.

"SensorSafe Car Seat Technology" product information page, retrieved on Sep. 18, 2018, 6 pages, Evenflo, retrieved from http://www.evenflo.com/sensorsafe/sensorsafe.html.

"Keeping Your Child Cool in the Car Seat When it is Hot Outside" blog post, retrieved on Dec. 21, 2018, 5 pages, The Car Seat Lady, retrieved from https://thecarseatlady.com/keepingcool/.

"Top 10 Ways to Keep Your Baby Cool in the Car Seat" blog post, retrieved on Dec. 21, 2018, 8 pages, Who Loves Babies, retrieved from https://wholovesbabies.com/10-ways-to-keep-baby-cool-in-car-seat/.

Golding, "Handbook of Clinical Neurology, Chapter 27 Motion Sickness" textbook, 2016, pp. 371-390, vol. 137 (3rd series), Elsevier B.V., Amsterdam, The Netherlands.

Phillips, "The Impact of Vehicle Motion During Transport on Animal Welfare" journal, 2015, pp. 303-308, 0034-5288, Elsevier B.V., Amsterdam, The Netherlands.

Hubbard, et al., "Risk of Vomiting and Diarrhoea in Dogs" journal, Dec. 1, 2007, pp. 755-757, DOI: 10.11, Veterinary Record, BMJ, London, United Kingdom.

Lee, et al., "Conductive Fiber-Based Ultrasensitive Textile Pressure Sensor for Wearable Electronics" journal, Apr. 17, 2015, pp. 2433-2439, vol. 27 No. 15, Advanced Materials, Wiley-VCH, Weinheim, Germany.

Rienzo, et al., "MagIC System: a New Textile-Based Wearable Device for Biological Signal Monitoring. Applicability in Daily Life and Clinical Setting" proceedings, Sep. 1-4, 2005, pp. 7167-7169, Engineering in Medicine and Biology 27th Annual Conference, IEEE, Shanghai, China.

Yamada, et al., "A Stretchable Carbon Nanotube Strain Sensor for Human-Motion Detection" journal Nature Nanotechnology, May 2011, pp. 296-301, vol. 6, www.nature.com, London, United Kingdom.

Golding, J.F., "Phasic Skin Conductance Activity and Motion Sickness" Journal Article, 1992, pp. 165-171, 63(3), Aviation, Space and Environmental Medicine, United States.

Meyer, et al., "Textile Pressure Sensor for Muscle Activity and Motion Detection" Symposium, 2006, 4 pages, IEEE International Symposium on Wearable Computers, Montreux, Switzerland.

International Search Report and Written Opinion of the International Searching Authority, from PCT Patent Application No. PCT/US2019/063322, dated Mar. 24, 2020.

International Preliminary Report on Patentability dated Jun. 16, 2021 for corresponding PCT/US2019/063322 (7 pages).

Communication from the China National Intellectual Property Administration dated Aug. 10, 2021.

Communication issued by the European Patent Office dated Aug. 6, 2021.

Communication issued by the European Patent Office dated Oct. 6, 2021.

* cited by examiner

TECHNIQUES TO OPTIMIZE VEHICULAR SYSTEMS FOR OCCUPANT PRESENCE AND CONDITION

FIELD

The present disclosure generally relates to the field of electronics. More particularly, an embodiment relates to techniques for optimizing vehicular systems for occupant presence and/or condition.

BACKGROUND

Issues with third-party car seats (including front-facing car seats (like a booster seat) or rear-facing car seats) have included poor temperature control at the car seat, particularly with smaller or older car models. And, in more rare but extreme cases, issues such as child fatalities have occurred, for example, due to parents forgetting to check the car seat before exiting a car and leaving a child in the car for long periods of time. Accordingly, it is imperative that such situations be avoided.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
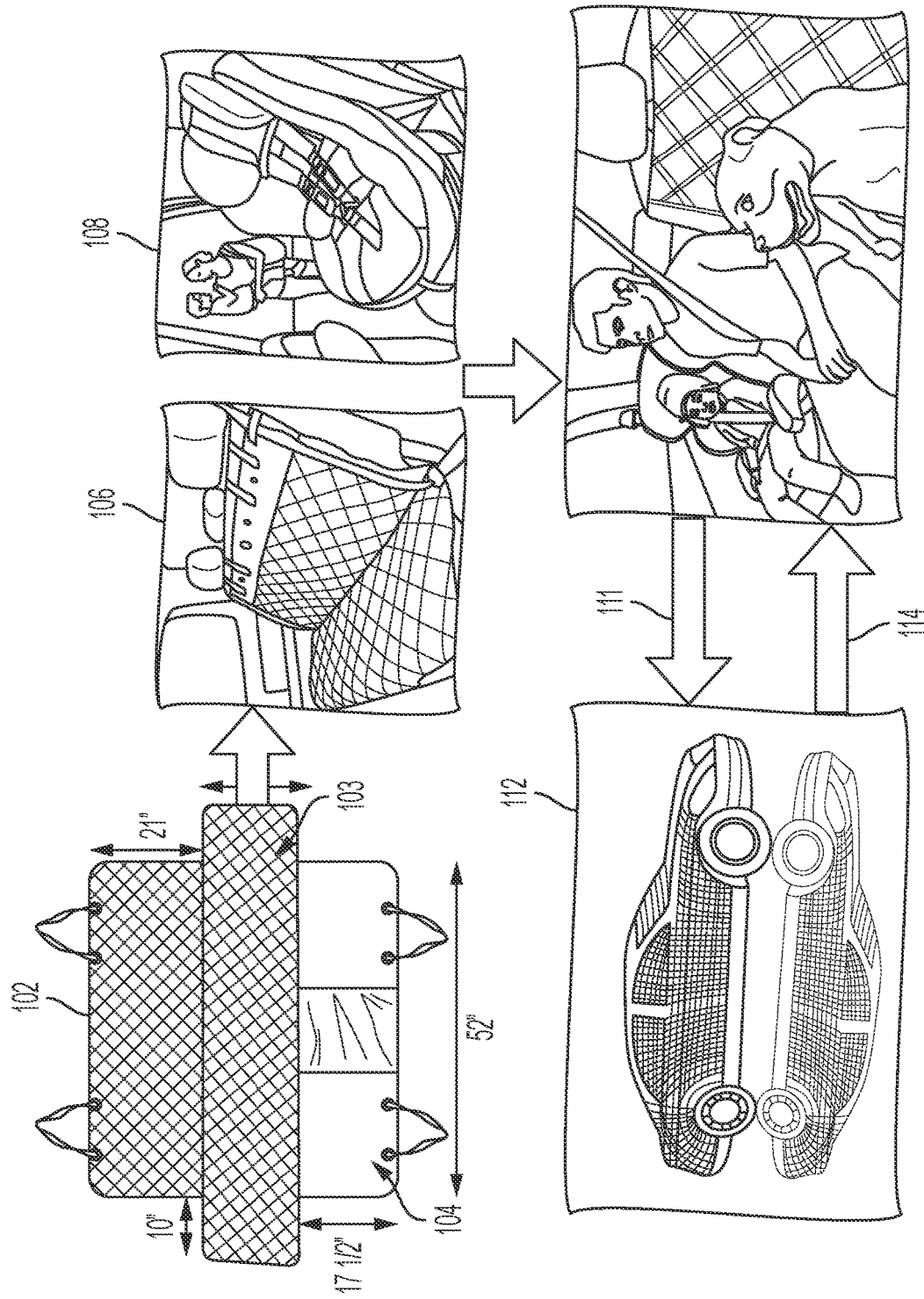
FIG. 1 illustrates a connected seat cover according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, issues with car seats (including front-facing car seats or rear-facing car seats) have included poor temperature control at the car seat, particularly with smaller or older car models. And, in more rare but extreme cases, issues such as child fatalities have occurred, for example, due to parents forgetting to check car seats before exiting a car and leaving children in the car for long periods of time. Accordingly, it is imperative that such situations be avoided not only for children but also other occupants such as any people or pets.

To this end, some embodiments relate to techniques for optimizing vehicular systems for occupant presence and/or condition. An embodiment detects the presence and/or condition of vehicle occupants (e.g., a passenger or pet). For example, logic and/or sensor(s) may be integrated (e.g., as original equipment or a retrofit (via a smart seat cover or pad) with one or more systems in a vehicle to facilitate the detection and respond accordingly. The response may include adjustments to air or environmental systems and may be further expanded to interior light management or entertainment purposes (such as enabling/disabling multimedia (e.g., sound/music, video, augmented reality, etc.) playback at speakers) in proximity to occupant(s) in response to detecting presence/location or absence of occupants, and other experiences in the vehicle. These types of user-experience focused devices become even more important as human drivers/operators (who would traditionally control air flow and other features in a vehicle) are replaced or supplemented with autonomous technology.

Moreover, for vehicle passengers/occupants such as infants/children as well as pets (e.g., dogs or cats), the ability to communicate presence and/or condition (such as hot, cold, asleep, moving, etc.) in real-time to a vehicle's air flow control system could improve both safety and user comfort/experience. Further, current passenger sensing systems in some late model luxury vehicles do not adequately sense passenger movement when under about 55 pounds. These systems may also be reliant on alerting if a seat belt is undone, and for example not if there is movement when the seat belt was never buckled/initiated. In addition, caretakers of young children and pets may use passive seat covers (and not smart or active car seats or covers, such as those discussed herein in some embodiments) to protect their upholstery. The smart or active seat cover/pad solutions solve both of these issues of safety and aesthetics in some embodiments as will be further discussed herein.

As discussed herein, a "vehicle" generally refers to any transportation device (whether or not it is capable of being operated autonomously, e.g., with little or no human/driver intervention), such as an automobile, a truck, a motorcycle, an airplane, a helicopter, a vessel/ship, a train, a drone, etc. whether or not the vehicle is a passenger or commercial vehicle, and regardless of the power source type (such as one or more of: fossil fuel(s), solar energy, electric energy, chemical energy, nuclear energy, etc.) and regardless of the physical state of the power source (e.g., solid, liquid, gaseous, etc.) used to move the vehicle. Also, while certain embodiments may mention a specific number of components/items, embodiments are not limited to these specific numbers, different or more/less components may be utilized depending on the implementation.

In one embodiment, logic (such one or more components of the control unit of FIGS. 2A/2B) may be included in an IoT device. Moreover, an "IoT" device generally refers to a device which includes electronic processing circuitry (such as one or more processors/cores, PLA (Programmable Logic Array), system on a chip (SoC), ASIC (Application Specific Integrated Circuit), field programmable gate array (FPGA), etc.), memory (e.g., to store software or firmware), one or more sensors (or is otherwise coupled to one or more sensors such as a camera, motion detector, etc.), and network connectivity to allow the IoT device to collect and/or exchange data. IoT devices can be cheaper than traditional computing devices to allow for their proliferation at remote locations. IoT devices can also reduce costs by using existing infrastructure (such as the Internet, a (third generation (3G), fourth generation (4G), or fifth generation (5G) cellular/wireless network, etc.). More generally, an IoT device may include one or more components such as those discussed herein with reference to the figures.

Generally, seat covers may be used to protect seats. They are however not intended to or designed to provide additional information to the Heating, Ventilation, and Air Conditioning (HVAC) system of a vehicle nor to other passengers. Primarily, these covers are marketed to families with children and/or pets as they are typically water resistant/washable and may collect pet hair. Many examples can be found online.

Moreover, none of the current solutions looks or operates as those discussed herein with reference to various embodiments. And none are capable to initiate a change in air flow in the vehicle. The current array of seat covers is not very customizable and make it difficult to reconfigure quickly if there is a need to adjust from the car seat configuration to one for an adult passenger or a pet. These solutions are also not instrumented and information regarding an undone seat belt or sudden passenger movement must be obtained visually by other passengers or by some existing system integrated into the vehicle. Moreover, some integrated detection systems may be more commonly found in more recent luxury cars and while these may offer some information on backseat passenger movements, the information is very limited and often inaccurate, particularly as it pertains to movement from those that weigh less than 55 lbs.

In an embodiment, the smart seat covers (which may be retrofitted to a vehicle or be integrated in the vehicle, e.g., as original equipment) can be configurable for a variety of seating modes (e.g., autonomous, backseat, bench seating, third party child car seat, etc.). Also, the smart seat covers may protect the upholstery of the vehicle and/or may be sensitive to the presence of a passenger (pet or person). This presence sensing (e.g., via pressure sensing, heat sensing, and/or other sensors) may allow the vehicle to alter the path/direction of the HVAC air flow towards an occupant and/or may further alert the driver/other passengers of unsafe movement, even by someone under 55 lbs that may not be wearing a seatbelt (e.g., a pet). One or more sensors may also be integrated into the smart covers to monitor condition(s) in more detail (such as hot/sweaty, cold, sleeping, active, etc.). In one embodiment, smart seat covers can be adjusted so they can wick away moisture/sweat to provide cooling or warmth a passenger is cold. As discussed herein, a "seat cover" is intended to also refer to a blanket or flattened seat cover. Hence, the smart/connected seat covers discussed herein may also be used as a blanket to cover any portion of a vehicle where occupants may be present, including a cargo area or a floor.

FIG. 1 illustrates a connected seat cover according to an embodiment. The vehicle seat cover/pad 102 may be designed with a matrix of embedded sensor(s) and/or logic configured to communicate with the vehicle as discussed herein. The seat cover/pad 102 communicates with the vehicle so that occupant presence and/or condition can be monitored and optimized.

Occupants can be adults, children in car seats, and/or pets such as dogs. The cover/pad may include a top portion 102, a middle portion 103, and a bottom portion 104 (which may be optionally attached to seats in front of the bench seat 106). The seat cover/pad shown here can cover the whole passenger bench 106 or selected seats, such as one passenger or a child car seat 108.

Logic and/or one or more sensors may send information 111 (e.g., in the form of signals) to a vehicle 112. The seat cover 102 may also receive information 114 (e.g., in the form of signals) from the vehicle 112, so that the smart seat cover can be adjusted (e.g., to wick away sweat/moisture (e.g., by activating a fan and/or radiator integrated with the seat cover) to provide cooling and/or warmth to a passenger.

Figure 2A:
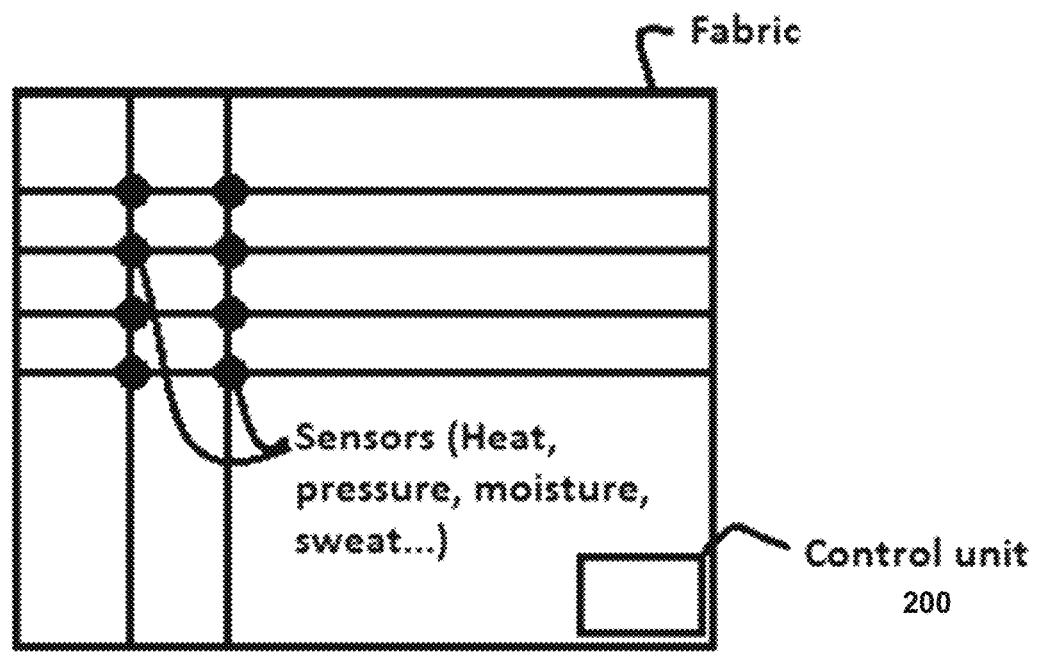
FIG. 2A shows a schematic of a connected vehicle seat cover, according to an embodiment.

FIG. 2A shows a schematic of a connected vehicle seat cover, according to an embodiment. As shown, a control unit/logic 200 is coupled to the body of the vehicle seat cover. The connected vehicle seat cover includes a fabric embedded with one or more sensors (e.g., to detect temperature, pressure (for presence detection), moisture, chemical(s)/molecule(s) associated with stress (e.g., via a chemical or biomolecular sensor), etc.). The sensors may be embedded in the fabric of the cover, or otherwise attached (e.g., sewn, glued, etc.) to the fabric. The cover may also embed the (e.g., detachable) control unit 200. The control unit may be detachable so the blanket/fabric cover can be washed with no concerns for the electronics.

Figure 2B:
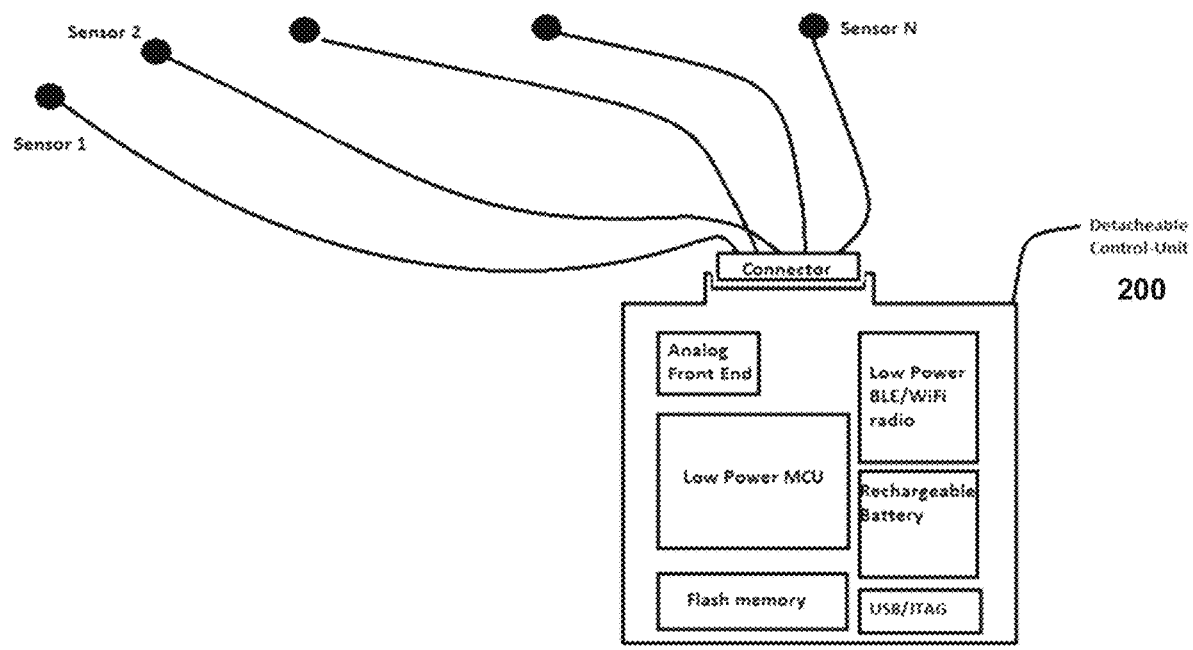
FIG. 2B shows components of the control unit of FIG. 2A, according to an embodiment.

FIG. 2B shows components of the control unit of FIG. 2A, according to an embodiment. As depicted in FIG. 2B, the control unit or logic 200 includes the following components: (1) Connector: the connector is the interface to the sensor(s); (2) Analog Front End (or Analog to Digital Converter (ADC)): that reads and converts weak signals received from the sensor(s) into digital signals; (3) Low power processor or Microcontroller Unit (MCU): the MCU may act as an application processor as the communications are handled by the transceiver (mentioned below) and the data collection/presentation from the sensors is handled by the Analog to Digital Front-End; (4) Flash memory (or other types of memory such as discussed herein with reference to FIGS. 8-11): this memory is used to store data for the low power MCU and may also be used to boot-strap the platform on firmware updates procedures; (5) Low power wireless (e.g., Bluetooth® communication or WiFi (Wireless Fidelity, including any variety of IEEE (Institute of Electrical and Electronics Engineers) 802.11) transceiver: Using the Bluetooth/WiFi communication will ensure compatibility with Smartphones and/or vehicles (either via Bluetooth communication or via Bluetooth to automotive CANBUS (Controller Area Network Bus) wireless converters). Using the Bluetooth and/or WiFi communication can ensure a high level of security via SSP (Secure Simple Pairing) protocol for Bluetooth communication or via WPS (WiFi protected set-up) or Direct-WiFi when connecting to WiFi networks; (6) Rechargeable battery: to ensure the autonomy of the control unit 200 and the operations of the smart-connected cover; and/or (7) USB (Universal Serial Bus) port which may be used both for Joint Test Action Group (JTAG)

communication for data transfer/programming (e.g., where JTAG is named for the group that codified the standard for verifying designs and testing printed circuit boards after manufacture) and charging of the rechargeable battery, for example. While some embodiments are discussed herein with reference to wireless communication, other types of communication may also be used such as via a cable (e.g., a USB cable), infrared signals, etc.

In one or more embodiments exchange of information between the control unit 200 and vehicle components is done in real-time.

Figure 3B:
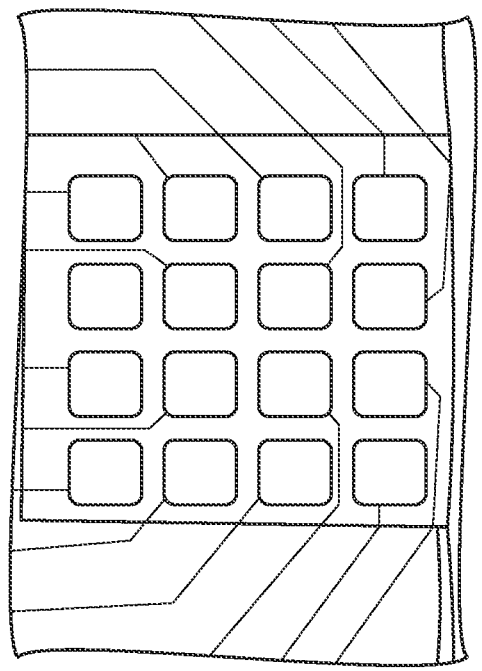
FIGS. 3A and 3B respectively illustrate cross-sectional and top views of a sensor array that can be used in a connected vehicle seat cover, according to some embodiments.
Figure 3A:
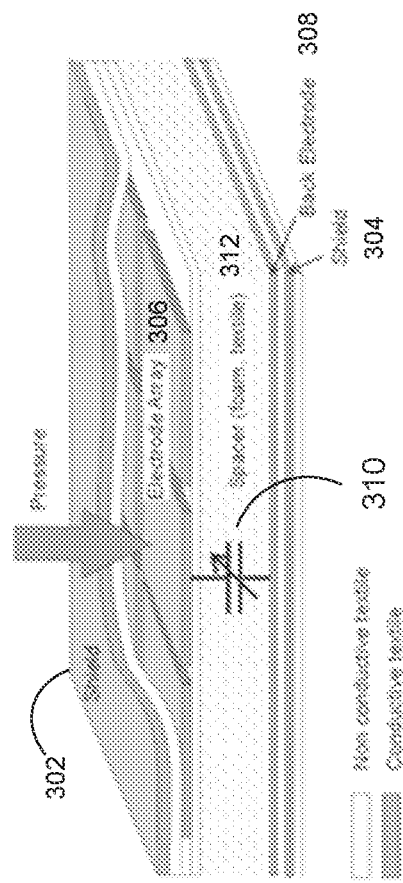

FIGS. 3A and 3B respectively illustrate cross-sectional and top views of a sensor array that can be used in a connected vehicle seat cover, according to some embodiments. In FIG. 2A, the schematic of the connected seat cover indicates that it may include a matrix or array of sensors. As shown in FIG. 3A, textiles used are capable of monitoring muscle/body activity and/or detect motion. FIG. 3A shows the cross section of an individual muscle activity or motion sensor. FIG. 3B shows a 4×4 sensor array as manufactured on a piece of fabric that may be utilized in one or more embodiments.

Referring to FIG. 3A, the sensor array may be protected by shielding 302-304 on both ends as shown. Upon application of pressure, an electrode array 306 may make electrical contact with the back electrode 308 through switch/transistor(s) 310 embedded in the non-conductive spacer foam/textile 312.

Figure 3C:
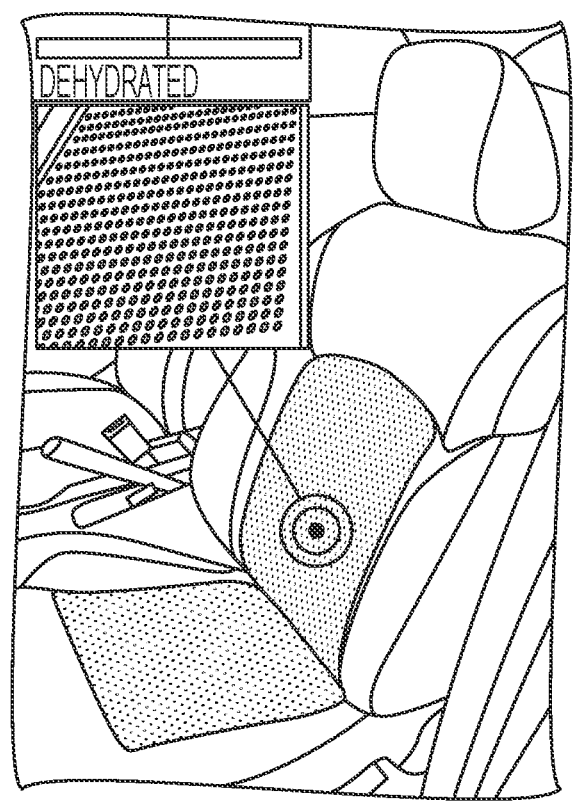
FIG. 3C shows a color-changing fabric/cover used in a vehicle seat, according to an embodiment.

FIG. 3C shows a color-changing fabric/cover used in a vehicle seat, according to an embodiment. The color-changing fabric may be used for moisture/sweat or stress sensing. The fabric may be used in any portion of a seat that comes in contact with an occupant, such as the bottom cushion, the back/top cushion, side bolsters (e.g., on bottom or top/back portions of the seat), head rest, etc. For example, the fabric may change color to indicate presence of moisture and/or excessive heat (e.g., detecting body heat above a threshold temperature) and/or chemicals/molecules linked to stress. This type of technology can be incorporated as one of the sensor types in a reconfigurable connected vehicle seat cover in one embodiment (such as those discussed with reference to FIGS. 1-3B).

In an embodiment, one example of usage is a smart/connected seat cover. In this use-case, the cover communicates with the vehicle via a wireless link (detachable control unit/logic 200 connects via Bluetooth communication or WiFi to a wireless CANBUS adaptor. In one example, the smart cover/blanket has a Smartphone associated application or app that offers to the user the choice to configure the cover to his/her vehicle. The app may include a list of vehicle models and/or be configured with the capability to download and transfer specification/information for CANBUS HVAC specific codes for each vehicle to the smart cover/blanket. The app may also be used to modify the default Bluetooth SSP communication pairing code of the cover (such as PIN (Personal Identification Number) or code) to make communications with the blanket/cover more secure. In an embodiment, the smart cover (and/or smart phone application) may provide an alarm or notification to the smartphone app if the vehicle is shut off and (optionally) after a period of time (e.g., based on expiration of a timer), occupants are still detected in the vehicle. In turn, a user can be notified that a child or pet has been left in the vehicle.

Figure 4:
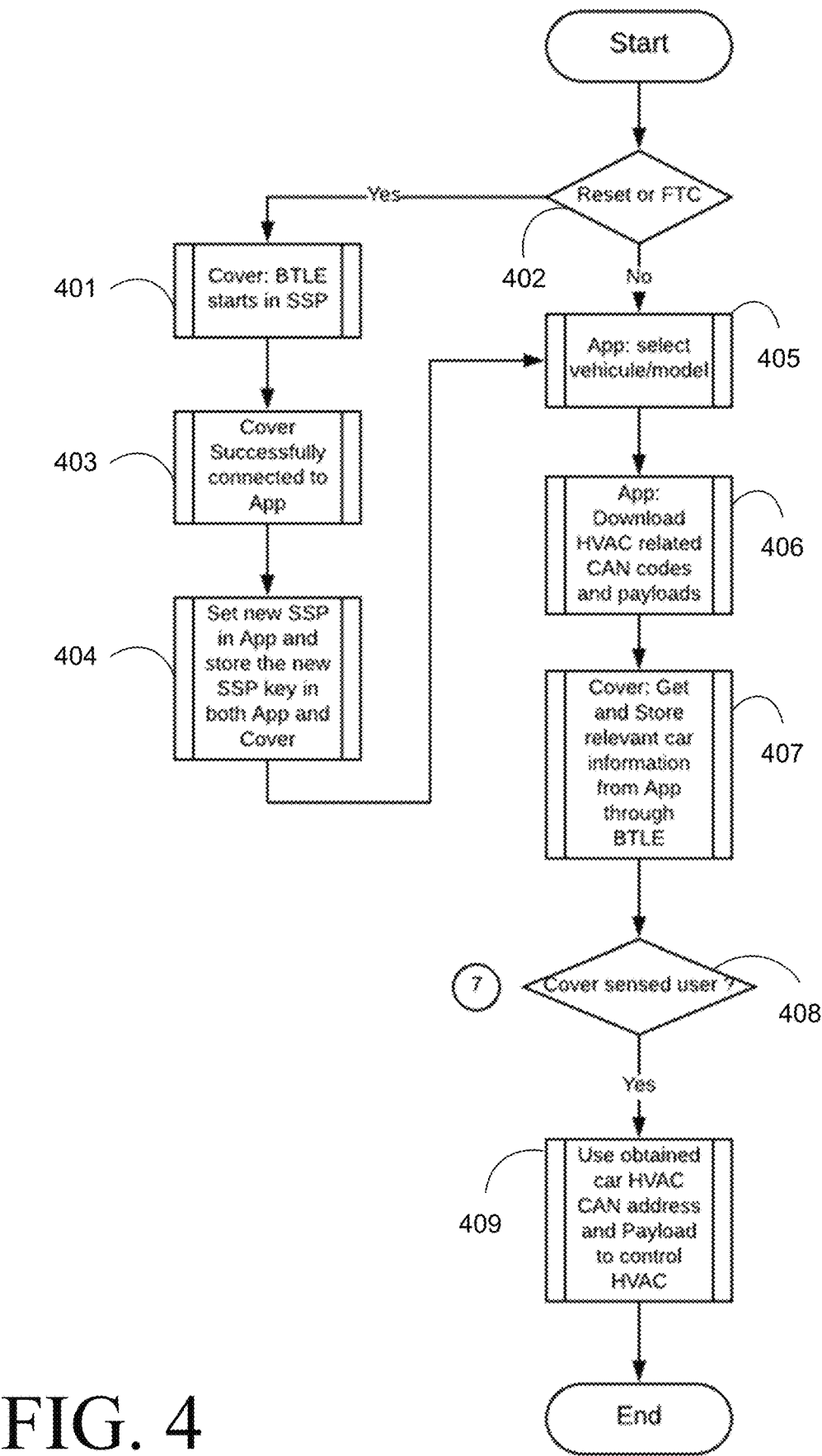
FIG. 4 illustrates a flow diagram of operations associated with an end-to-end connected vehicle system, according to an embodiment.

FIG. 4 illustrates a flow diagram of operations associated with an end-to-end connected vehicle system, according to an embodiment. One or more of the operations shown in FIG. 4 provide interaction between the smartphone app and the smart cover.

At operation 401, the wireless communication (e.g., via WiFi and/or Bluetooth (BTLE) communication) of the cover is initialized. For example, a new SSP pairing code (e.g., "PIN" code) may be set at RESET or first time configuration (FTC) per operation 402. At operation 403, the cover is wirelessly connected to the app. At operation 404, a new SSP is set in the app and the new SSP key stored in both the app and the cover (e.g., in the memory in the control unit/logic 200).

Next, the app proceeds with selection of a vehicle and/or model at operation 405. At operation 406, the app either accesses previously stored information on the app or downloads the vehicle's HVAC related CANBUS codes and/or payloads to allow for turn ON/OFF the vehicle HVAC system and/or directing the flow towards a selected occupant who is in contact with the smart cover. For example, vent direction and/or circulation fan speed/direction in a vehicle may be controlled. Vent/fan direction may be adjusted though actuators to turn vent fins towards a selected occupant. Fan speed may be adjusted by sending a signal to the fan's control module and/or adjusting its supplied power (e.g., voltage, current, etc.). In an embodiment, the direction may be determined by infrared signals exchanged between the smart cover and HVAC system of the vehicle. At operation 407, the cover obtains and stores the relevant vehicle information from the app through their wireless connection. At operation 408, the cover detects user presence, e.g., through various sensors discussed herein such as with reference to FIGS. 2-7. After detecting user presence, the detachable control unit/logic 200 uses the obtained car HVAC CANBIS address and payload to control the vehicles HVAC system at operation 409.

For example, if the cover is being used in first time configuration (FTC) or the user hits the RESET button on the detachable control unit (DCU) 200, then the Bluetooth chip embedded on the DCU will start in SSP mode with a default pre-programmed key for pairing. The user, using the mobile app, connects to the cover. The user is prompted to change his SSP pairing code for a personalized and more secure key. The new SSP pairing key is sent to the cover via the Bluetooth link and is stored on the cover for future usages. On the mobile app, the user is prompted to choose his vehicle maker and relevant information. The mobile app connects to a back-end system (e.g., via the Internet or cloud) storing for each vehicle type and make a database of relevant CANBUS information.

In one embodiment, one example of the messages that the app downloads from backend server is the following JSON (JavaScript™ Object Notation):

```
{
    "CarBodyType": "Coupe",
    "CarMake": "Ford",
    "CarModel": "Mustang",
    "CarProductionYear": "2018",
    "CarVersion": "GT500",
    "AC_Control_Codes": {
        "ac_toggle": "0x5C",
        "ac_unit_toggle": "0x14",
        "max_ac_toggle": "0x38",
        "recirculation_toggle": "0x3C",
        "dual_temperature_toggle": "0x18",
        "passenger_temp_up": "0x24",
        "passenger_temp_down": "0x28",
        "driver_temp_up": "0x1C",
```

```
        "driver_temp_down": "0x20",
        "auto": "0x34",
        "wheel_heat_toggle": "0x78",
        "defrost_max_toggle": "0x64",
        "defrost_toggle": "0x4C",
        "rear_defrost_toggle": "0x58",
        "body_fan_toggle": "0x04",
        "feet_fan_toggle": "0x0C",
        "fan_up": "0x2C",
        "fan_down": "0x30"
    }
}
```

In this example, the connected cover stores the JSON and disconnects from the mobile app. The cover (e.g., through its sensors) detects the presence of a user through thermal sensors, pressure sensors, humidity sensors, moisture, and/or chemical (ions from sweat) sensors such as those depicted in FIGS. 2, 3A, 3B, 3C, 4, 5, 6, and 7.

Further, the cover may be communicatively connected to the vehicle CANBUS either through BTLE/WiFi or through an off the shelf Bluetooth/CANBUS communication converter. The connected cover uses the control codes and values defined in the JSON to drive the HVAC system of the vehicle. An example of a CANBUS packet frame is shown in FIG. 5.

Figure 5:
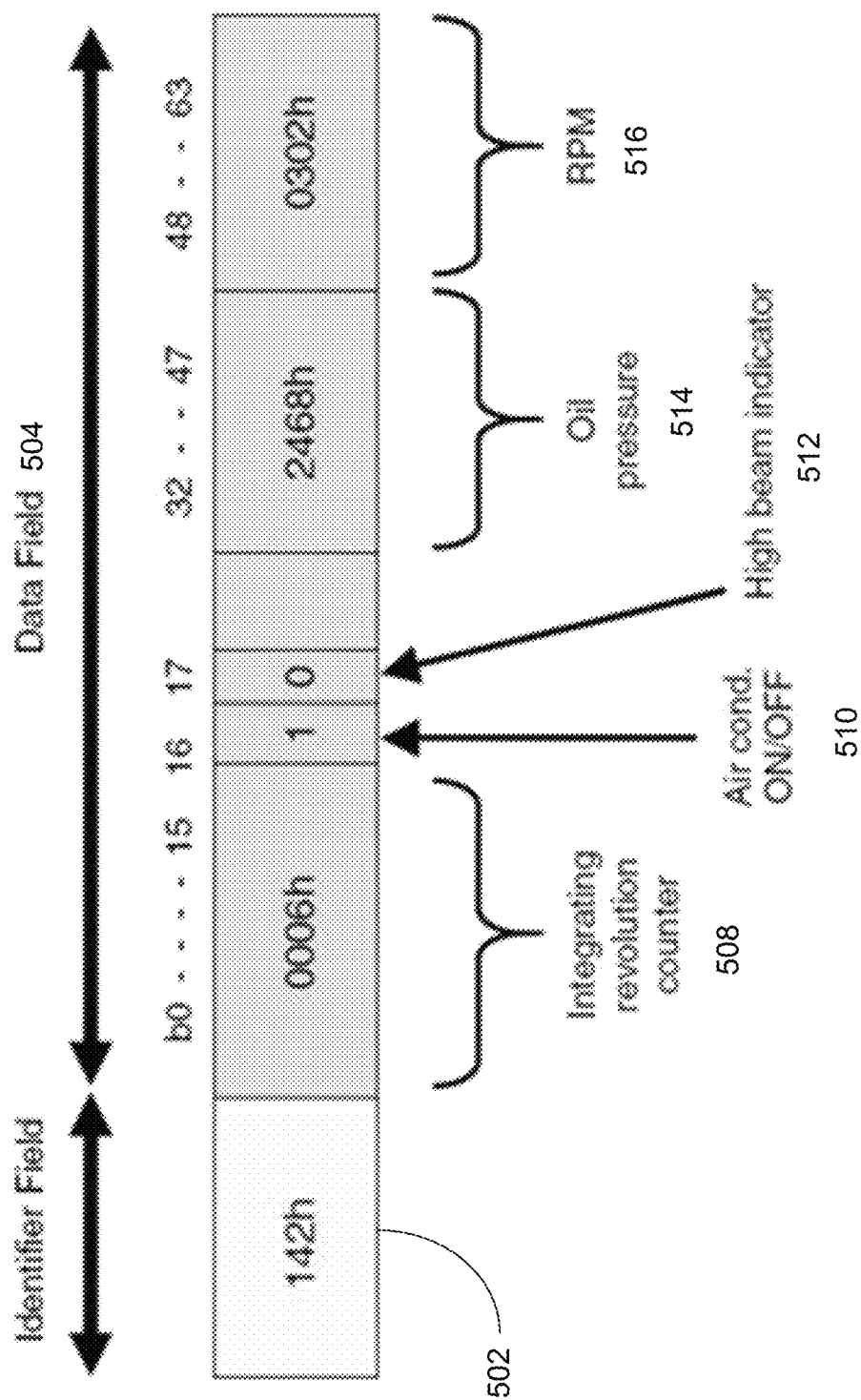
FIG. 5 illustrates a sample CANBUS frame for a connected vehicle, according to an embodiment.

More particularly, FIG. 5 illustrates a sample CANBUS frame for a connected vehicle, according to an embodiment. While sending the CANBUS command over BTLE to the wireless CANBUS receiver/adapter, the MCU on the detachable control unit/logic 200 performs protocol encapsulation of CANBUS frames over BTLE.

As shown in FIG. 5, the frame may include an identifier field 502 (e.g., to identify the destination address of the CANBUS frame (e.g., the vehicle's HVAC system)) and a data field 504 (which includes further information to adjust various vehicle systems). For example, the data field 504 may specify integration revolution counter 508, HVAC on/off condition 510, high beam indicator 512, oil pressure 514, and engine Rounds Per Minute (RPM) 516.

In some embodiments, the smart/connected cover detects motion/presence of occupant in the vicinity of the cover. For example, the sensors embedded within the fabric of the cover can be seen as an MxN matrix and the value reading can be represented by the following matrix:

$$S = \begin{bmatrix} S_1^1 & S_2^1 & S_3^1 & & S_k^1 & S_N^1 \\ \cdots & \cdots & \cdots & \cdots & \cdots & \cdots \\ S_1^M & S_2^M & S_3^M & & S_k^M & S_N^M \end{bmatrix}$$

In order to proceed to meaningful values of S, S is normalized to its maximum value, then the values of the obtained matrix are thresholded to a value $0<\lambda<1$, and S becomes sparse by construction.

An example of the obtained matrix is:

$$\begin{bmatrix} 0.5 & 0.5 & 0 & 0 & 0 & 0.9 & 0.9 \\ 0.75 & 0.75 & 0 & 0 & 0 & 0.85 & 1 \\ 0 & 0 & 0 & 0 & 0 & 0.7 & 0.5 \end{bmatrix},$$

where the example shows that the cover can detect two users by the distribution of the pressure exercised on the embedded sensors.

Such a representation can provide a mapping of where the occupants (e.g., of the rear-seat) are distributed. This extra information provided by the cover can be used by logic in the vehicle to ensure that the detected vehicle occupants have their seat belts properly engaged, and combined with the first use case, can adjust the HVAC accordingly.

In at least one embodiment, the condition or state of occupant(s) may be detected using the smart/connected seat cover. The sensor(s) embedded within the fabric of the matrix given in the motion detection example previously can be used to measure an initial condition and sample values of the sensor at subsequent time intervals/points. Changes in the matrix representation that reach a certain threshold may then be used to adjust the HVAC or other systems in the vehicle.

One other use case for the smart/connected cover (e.g., similar to the flow of activating the HVAC system of FIG. 4) may be used for (e.g., rear-seat) security and/or motion sickness prevention (for example, for children and/or pets), as the cover may be capable of detecting movement and/or condition or state (with the appropriate sensors).

In humans, the most predominant sign of motion sickness includes vomiting; however, symptoms could also include stomach awareness, sweating and facial pallor (sometimes called "cold sweating"), increased salivation, sensations of bodily warmth, dizziness, drowsiness (also denoted as the "Sopite syndrome"), sometimes headache, and, unsurprisingly, loss of appetite and increased sensitivity to odors. In dogs, signs of motion sickness include hyper salivation or drooling, panting, swallowing, and/or lip-licking. As with humans, abdominal heaving, retching, and vomiting can also occur progressively.

To this end, at least one embodiment allows for monitoring of some of these indicators for motion sickness in both humans and pets. Included in some embodiments are temperature adjustments, which can be particularly helpful to both humans and pets that suffer from motion sickness, as motion sickness has been shown to disrupt temperature regulation. Anecdotally, it has been reported that adjusting the location of fans can also help to alleviate motion sickness which is also possible in one or more embodiments as previously discussed.

Figure 6:
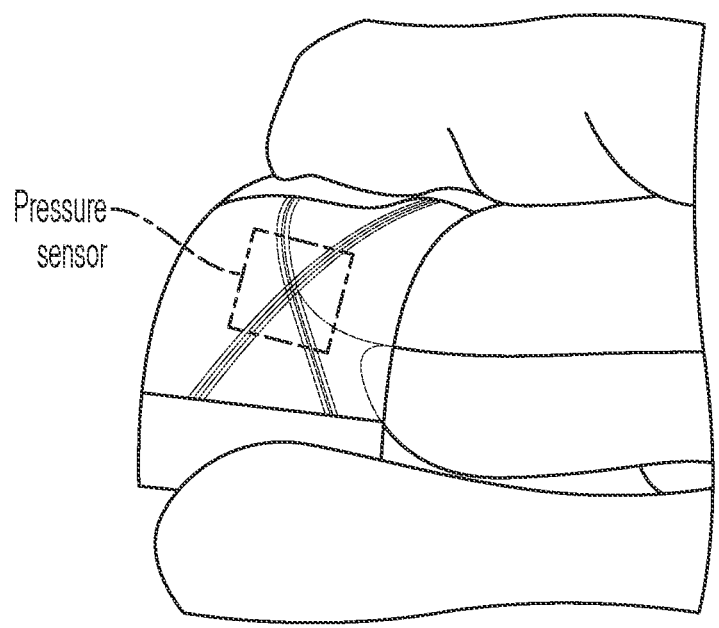
FIG. 6 shows an ultrasensitive pressure sensor fabricated on a flexible substrate, according to an embodiment.

Other types of sensors that could be used in the connected seat cover include flexible pressure sensors, see, e.g., FIG. 6. More particularly, FIG. 6 shows an ultrasensitive pressure sensor fabricated on a flexible, plastic (e.g., Polyethylene Terephthalate (PET)) substrate, e.g., using 2×2 conductive fibers, according to one embodiment.

Figure 7:
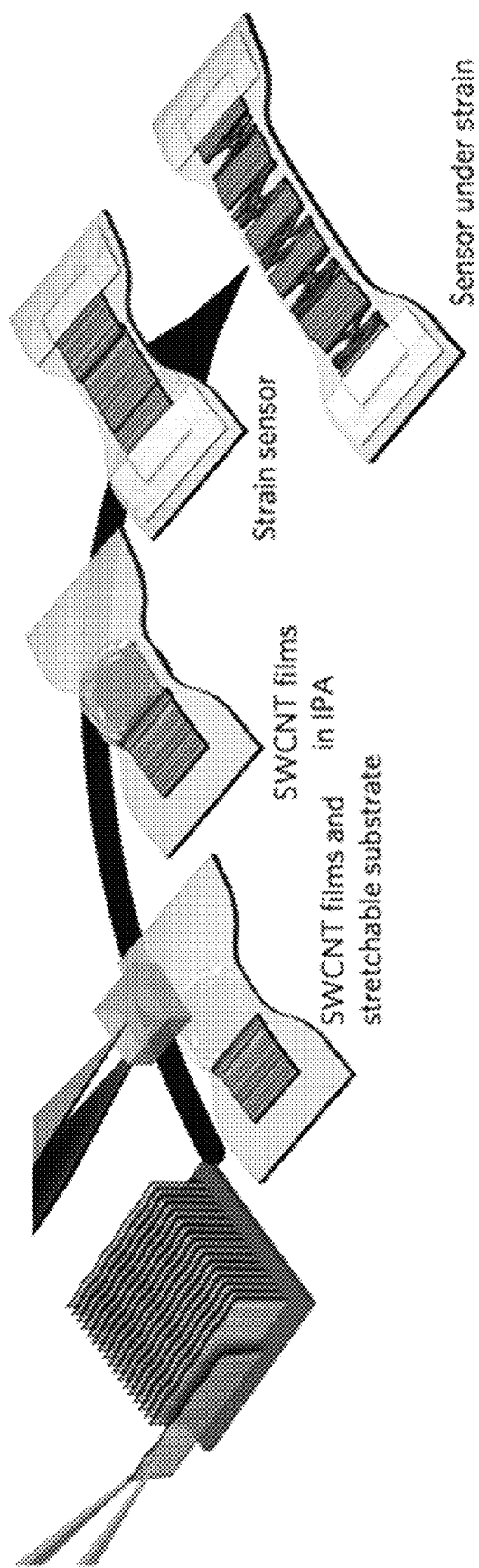
FIG. 7 shows an example of a flexible strain sensor according to an embodiment.

FIG. 7 shows an example of a flexible strain sensor, according to an embodiment. More specifically, FIG. 7 shows a single-walled carbon nanotube (SWCNT) strain sensor constructed on a stretchable substrate and a visual representation of the sensor material under strain. The flexible strain sensor of FIG. 7 may be used as one of the sensors discussed herein to detect pressure when the SWCNT films are folded/strained.

Figure 8:
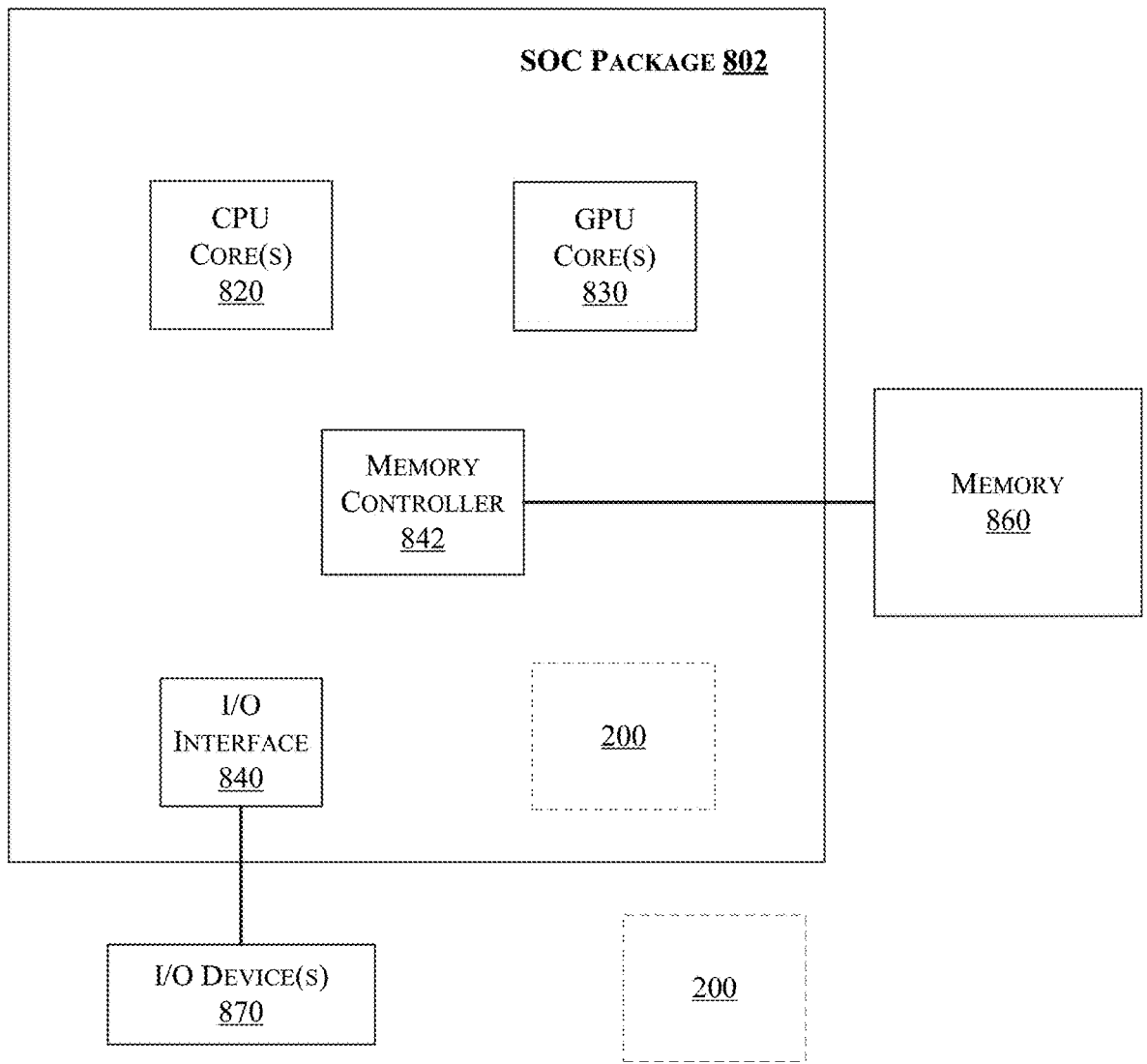
FIGS. 8 and 9 illustrates block diagrams of embodiments of computing systems, which may be utilized in various embodiments discussed herein.

FIG. 8 illustrates a block diagram of an SOC package in accordance with an embodiment. As illustrated in FIG. 8, SOC 802 includes one or more Central Processing Unit (CPU) cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like.

Figure 9:
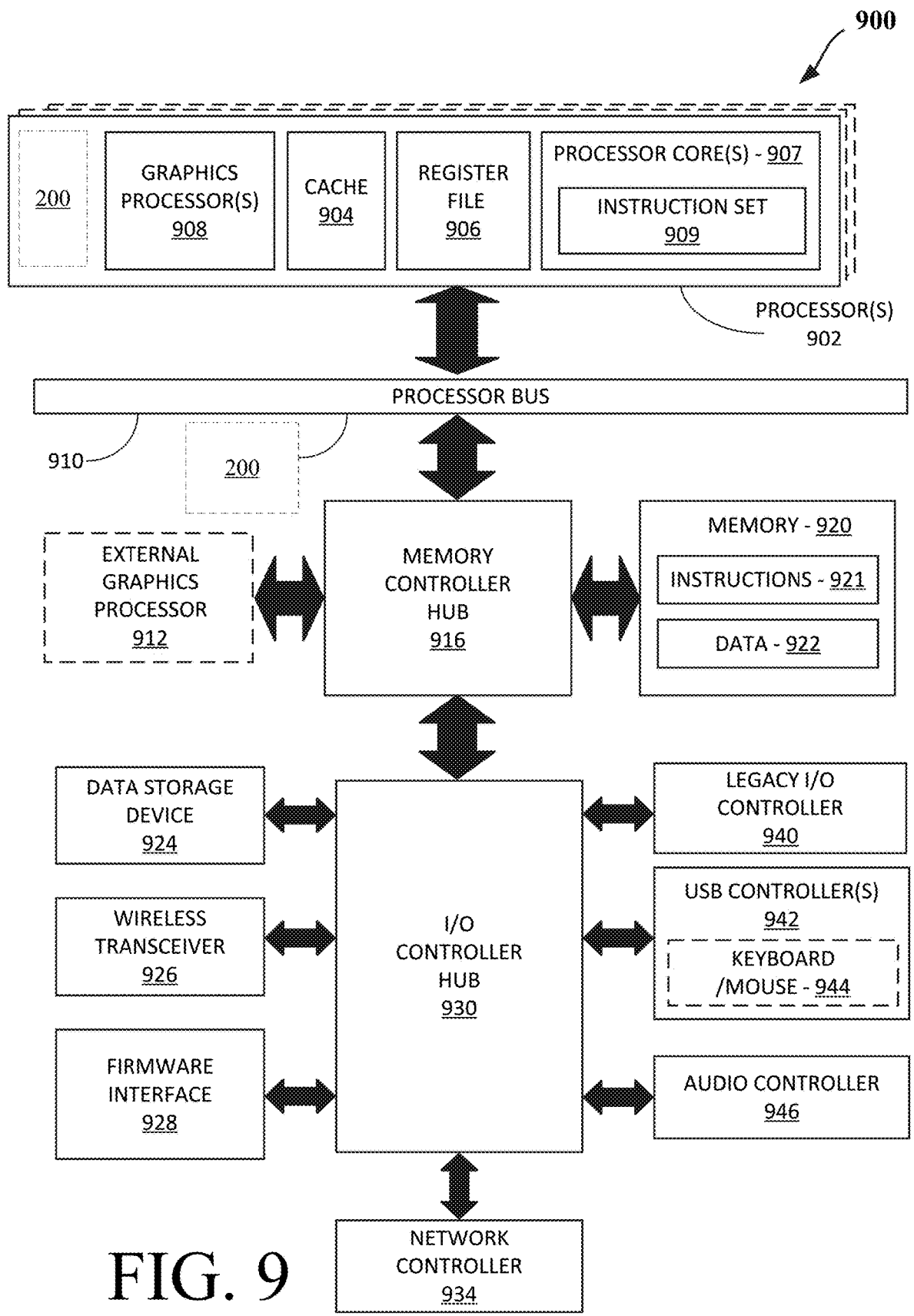

FIG. 9 is a block diagram of a processing system 900, according to an embodiment. In various embodiments the system 900 includes one or more processors 902 and one or more graphics processors 908, and may be a single processor desktop system, a multiprocessor workstation system, or a server system having a large number of processors 902 or processor cores 907. In on embodiment, the system 900 is a processing platform incorporated within a system-on-a-chip (SoC or SOC) integrated circuit for use in mobile, handheld, or embedded devices.

An embodiment of system 900 can include, or be incorporated within a vehicle, server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, processor 902 is coupled to a processor bus 910 to transmit communication signals such as address, data, or control signals between processor 902 and other components in system 900. In one embodiment the system 900 uses an exemplary 'hub' system architecture, including a memory controller hub 916 and an Input Output (I/O) controller hub 930. A memory controller hub 916 facilitates communication between a memory device and other components of system 900, while an I/O Controller Hub (ICH) 930 provides connections to I/O devices via a local I/O bus. In one embodiment, the logic of the memory controller hub 916 is integrated within the processor.

Memory device 920 can be a dynamic random-access memory (DRAM) device, a static random access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 executes an application or process. Memory controller hub 916 also couples with an optional external graphics processor 912, which may communicate with the one or more graphics processors 908 in processors 902 to perform graphics and media operations.

In some embodiments, ICH 930 enables peripherals to connect to memory device 920 and processor 902 via a high-speed I/O bus. The I/O peripherals include, but are not limited to, an audio controller 946, a firmware interface 928, a wireless transceiver 926 (e.g., Wi-Fi, Bluetooth communication), a data storage device 924 (e.g., hard disk drive, flash memory, etc.), and a legacy I/O controller 940 for coupling legacy (e.g., Personal System 2 (PS/2)) devices to the system. One or more Universal Serial Bus (USB) controllers 942 connect input devices, such as keyboard and mouse 944 combinations. A network controller 934 may also couple to ICH 930. In some embodiments, a high-performance network controller (not shown) couples to processor bus 910. It will be appreciated that the system 900 shown is exemplary and not limiting, as other types of data processing systems that are differently configured may also be used. For example, the I/O controller hub 930 may be integrated within the one or more processor 902, or the memory controller hub 916 and I/O controller hub 930 may be integrated into a discreet external graphics processor, such as the external graphics processor 912.

Figure 10:
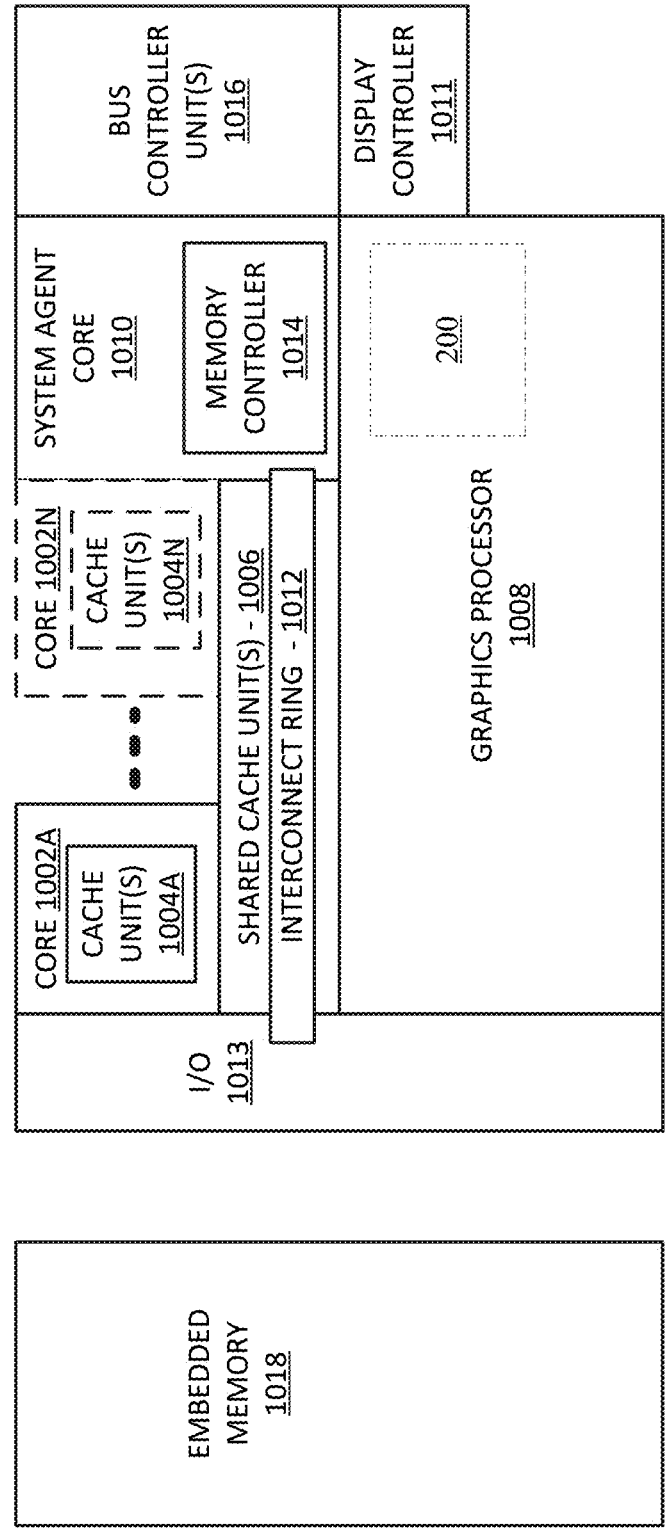
FIGS. 10 and 11 illustrate various components of processors in accordance with some embodiments.

FIG. 10 is a block diagram of an embodiment of a processor 1000 having one or more processor cores 1002A to 1002N, an integrated memory controller 1014, and an integrated graphics processor 1008. Those elements of FIG. 10 having the same reference numbers (or names) as the elements of any other figure herein can operate or function in any manner similar to that described elsewhere herein, but are not limited to such. Processor 1000 can include additional cores and including additional core 1002N represented by the dashed lined boxes. Each of processor cores 1002A to 1002N includes one or more internal cache units 1004A to 1004N. In some embodiments each processor core also has access to one or more shared cached units 1006.

The internal cache units 1004A to 1004N and shared cache units 1006 represent a cache memory hierarchy within the processor 1000. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1006 and 1004A to 1004N.

In some embodiments, processor 1000 may also include a set of one or more bus controller units 1016 and a system agent core 1010. The one or more bus controller units 1016 manage a set of peripheral buses, such as one or more Peripheral Component Interconnect buses (e.g., PCI, PCI Express). System agent core 1010 provides management functionality for the various processor components. In some embodiments, system agent core 1010 includes one or more integrated memory controllers 1014 to manage access to various external memory devices (not shown).

In some embodiments, one or more of the processor cores 1002A to 1002N include support for simultaneous multi-threading. In such embodiment, the system agent core 1010 includes components for coordinating and operating cores 1002A to 1002N during multi-threaded processing. System agent core 1010 may additionally include a power control unit (PCU), which includes logic and components to regulate the power state of processor cores 1002A to 1002N and graphics processor 1008.

In some embodiments, processor 1000 additionally includes graphics processor 1008 to execute graphics processing operations. In some embodiments, the graphics processor 1008 couples with the set of shared cache units 1006, and the system agent core 1010, including the one or more integrated memory controllers 1014. In some embodiments, a display controller 1011 is coupled with the graphics processor 1008 to drive graphics processor output to one or more coupled displays. In some embodiments, display controller 1011 may be a separate module coupled with the graphics processor via at least one interconnect, or may be integrated within the graphics processor 1008 or system agent core 1010.

In some embodiments, a ring based interconnect unit 1012 is used to couple the internal components of the processor 1000. However, an alternative interconnect unit may be used, such as a point-to-point interconnect, a switched interconnect, or other techniques, including techniques well known in the art. In some embodiments, graphics processor 1008 couples with the ring interconnect 1012 via an I/O link 1013.

The exemplary I/O link 1013 represents at least one of multiple varieties of I/O interconnects, including an on package I/O interconnect which facilitates communication between various processor components and a high-performance embedded memory module 1018, such as an eDRAM (or embedded DRAM) module. In some embodiments, each of the processor cores 1002 to 1002N and graphics processor 1008 use embedded memory modules 1018 as a shared Last Level Cache.

In some embodiments, processor cores 1002A to 1002N are homogenous cores executing the same instruction set architecture. In another embodiment, processor cores 1002A to 1002N are heterogeneous in terms of instruction set architecture (ISA), where one or more of processor cores 1002A to 1002N execute a first instruction set, while at least one of the other cores executes a subset of the first instruction set or a different instruction set. In one embodiment processor cores 1002A to 1002N are heterogeneous in terms of microarchitecture, where one or more cores having a relatively higher power consumption couple with one or more power cores having a lower power consumption. Additionally, processor 1000 can be implemented on one or more chips or as an SoC integrated circuit having the illustrated components, in addition to other components.

Figure 11:
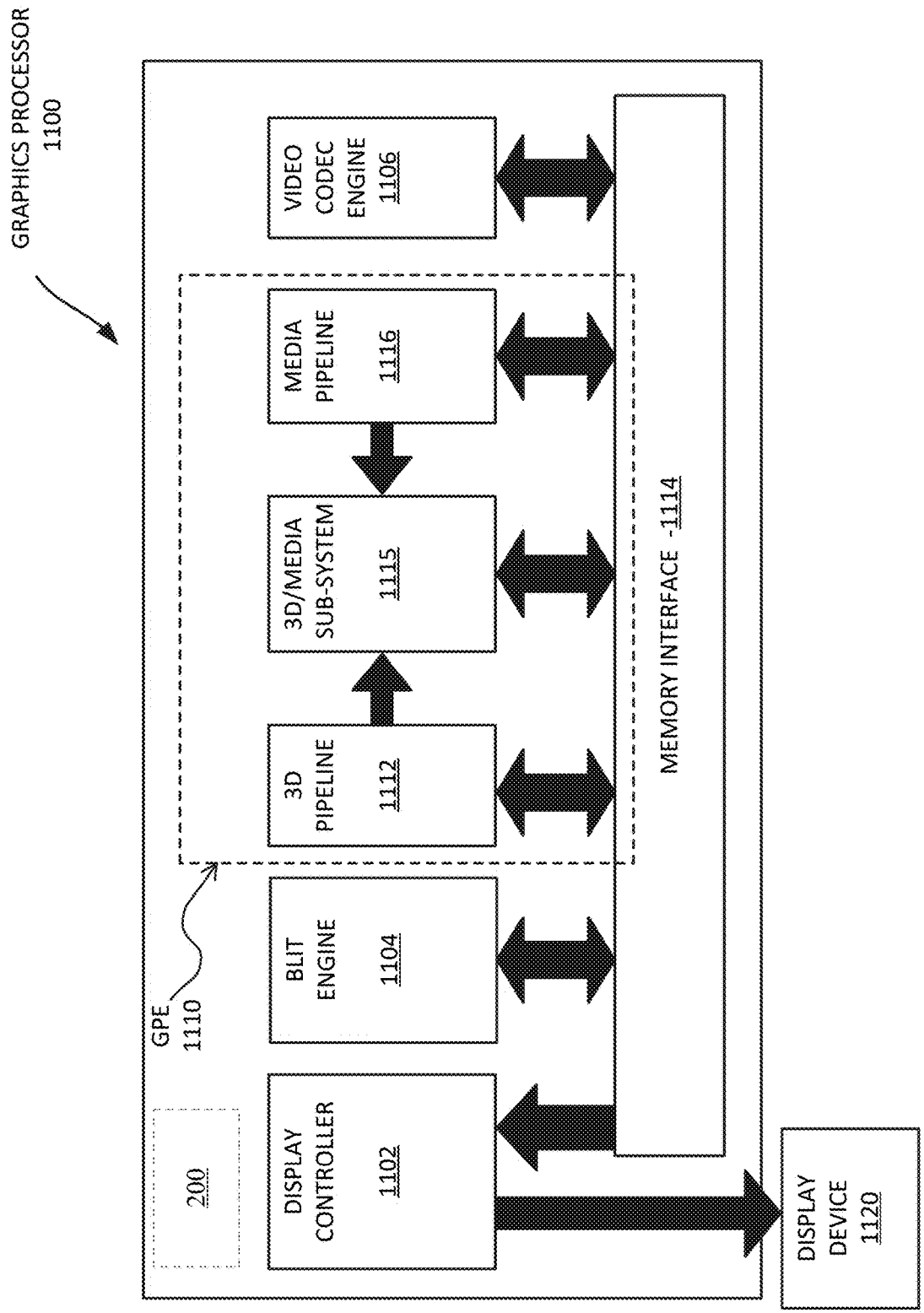

FIG. 11 is a block diagram of a graphics processor 1100, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1100 includes a memory interface 1114 to access memory. Memory interface 1114 can be an interface to local memory, one or more internal caches, one or more shared external caches, and/or to system memory.

In some embodiments, graphics processor 1100 also includes a display controller 1102 to drive display output data to a display device 1120. Display controller 1102 includes hardware for one or more overlay planes for the display and composition of multiple layers of video or user interface elements. In some embodiments, graphics processor 1100 includes a video codec engine 1106 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1100 includes a block image transfer (BLIT) engine 1104 to perform two-dimensional (2D) rasterizer operations including, for example, bit-boundary block transfers. However, in one embodiment, 11D graphics operations are performed using one or more components of graphics processing engine (GPE) 1110. In some embodiments, graphics processing engine 1110 is a compute engine for performing graphics operations, including three-dimensional (3D) graphics operations and media operations.

In some embodiments, GPE 1110 includes a 3D pipeline 1112 for performing 3D operations, such as rendering three-dimensional images and scenes using processing functions that act upon 3D primitive shapes (e.g., rectangle, triangle, etc.). The 3D pipeline 1112 includes programmable and fixed function elements that perform various tasks within the element and/or spawn execution threads to a 3D/Media sub-system 1115. While 3D pipeline 1112 can be used to perform media operations, an embodiment of GPE 1110 also includes a media pipeline 1116 that is specifically used to perform media operations, such as video post-processing and image enhancement.

In some embodiments, media pipeline 1116 includes fixed function or programmable logic units to perform one or more specialized media operations, such as video decode acceleration, video de-interlacing, and video encode acceleration in place of, or on behalf of video codec engine 1106. In some embodiments, media pipeline 1116 additionally includes a thread spawning unit to spawn threads for execution on 3D/Media sub-system 1115. The spawned threads perform computations for the media operations on one or more graphics execution units included in 3D/Media sub-system 1115.

In some embodiments, 3D/Media subsystem 1115 includes logic for executing threads spawned by 3D pipeline 1112 and media pipeline 1116. In one embodiment, the pipelines send thread execution requests to 3D/Media sub-system 1115, which includes thread dispatch logic for arbitrating and dispatching the various requests to available thread execution resources. The execution resources include an array of graphics execution units to process the 3D and media threads. In some embodiments, 3D/Media subsystem 1115 includes one or more internal caches for thread instructions and data. In some embodiments, the subsystem also includes shared memory, including registers and addressable memory, to share data between threads and to store output data.

The following examples pertain to further embodiments. Example 1 includes an apparatus comprising: logic circuitry to detect presence or condition of one or more occupants of a vehicle based on sensor data; and memory to store information corresponding to one or more functions of the vehicle, wherein the logic circuitry is to transmit a request to the vehicle to cause an adjustment to the one or more functions of the vehicle based at least in part on the stored information. Example 2 includes the apparatus of example 1, wherein the logic circuitry is coupled to a vehicle seat cover, wherein one or more sensors are coupled to the vehicle seat cover to generate the sensor data. Example 3 includes the apparatus of example 2, wherein the logic circuitry is detachable from the vehicle seat cover. Example 4 includes the apparatus of example 2, wherein the vehicle seat cover is capable of lying flat in a portion of the vehicle. Example 5 includes the apparatus of example 2, wherein the one or more sensors are attached or embedded in a fabric of the vehicle seat cover. Example 6 includes the apparatus of example 5, wherein the fabric is capable of changing color in response to contact with moisture, one or more chemicals or molecules linked to stress, or excessive heat. Example 7 includes the apparatus of example 1, wherein the logic circuitry is to detect presence and/or location of the one or more occupants based on a distribution of pressure exercised on a plurality of sensors, wherein the one or more sensors are to be located in a matrix format to generate the sensor data. Example 8 includes the apparatus of example 1, wherein the stored information comprises Controller Area Network Bus (CANBUS) information corresponding to the one or more functions of the vehicle. Example 9 includes the apparatus of example 1, wherein the one or more functions comprise one or more of: a Heating, Ventilation, and Air Conditioning (HVAC), vent direction, fan direction, fan speed, seatbelt warning, interior lighting, or entertainment. Example 10 includes the apparatus of example 1, wherein the logic circuitry is coupled to analog front end to receive signals from one or more sensors, wherein the one or more sensors are to generate the sensor data. Example 11 includes the apparatus of example 1, wherein the logic circuitry is coupled to a wireless transceiver to wirelessly transmit the request to one or more components of the vehicle via a CANBUS. Example 12 includes the apparatus of example 1, wherein a smart phone is to transmit the information to the logic circuitry. Example 13 includes the apparatus of example 1, wherein the logic circuitry is coupled to a Universal Serial Bus (USB) to communicate data and/or charge a battery coupled to the logic circuitry. Example 14 includes the apparatus of example 1, wherein the logic circuitry is coupled to at least one battery to receive electric power from the battery. Example 15 includes the apparatus of example 14, wherein the at least one battery is rechargeable. Example 16 includes the apparatus of example 1, further comprising one or more sensors to generate the sensor data. Example 17 includes the apparatus of example 16, wherein the one or more sensors comprise one or more of: a moisture sensor, a pressure sensor, a chemical or biomolecular sensor, or temperature sensor. Example 18 includes the apparatus of example 17, wherein the pressure sensor comprises a flexible strain sensor or an ultrasensitive pressure sensor fabricated on a flexible substrate. Example 19 includes the apparatus of example 1, wherein the memory comprises non-volatile memory. Example 20 includes the apparatus of example 19, wherein the non-volatile memory comprises flash memory. Example 21 includes the apparatus of example 1, wherein the logic circuitry comprises one or more microcontrollers or processors, the processors having one or more processor cores, to communicate the request to a component of the vehicle, wherein the component of the vehicle is coupled to a Controller Area Network BUS (CANBUS) to receive the request. Example 22 includes the apparatus of example 1, wherein a System On Chip (SOC) device or a single integrated circuit device comprises one or more of: the logic circuitry, a wireless transceiver, and the memory.

Example 23 includes one or more computer-readable medium comprising one or more instructions that when executed on at least one processor configure the at least one processor to perform one or more operations to: detect presence or condition of one or more occupants of a vehicle based on sensor data; and store information corresponding to one or more functions of the vehicle in memory, wherein the at least one processor is to transmit a request to the vehicle to cause an adjustment to the one or more functions of the vehicle based at least in part on the stored information. Example 24 includes the one or more computer-readable medium of example 23, wherein the at least one processor is coupled to a vehicle seat cover, wherein one or more sensors are coupled to the vehicle seat cover to generate the sensor data. Example 25 includes the one or more computer-readable medium of example 23, further comprising one or more instructions that when executed on the at least one processor configure the at least one processor to perform one or more operations to cause detection of presence and/or location of the one or more occupants based on a distribution of pressure exercised on a plurality of sensors, wherein the one or more sensors are to be located in a matrix format to generate the sensor data.

Example 26 includes the one or more computer-readable medium of example 23, further comprising one or more instructions that when executed on the at least one processor configure the at least one processor to perform one or more operations to cause generation of an alarm or a notification to indicate that the one or more occupants remain in the vehicle after vehicle shut down. Example 27 includes the one or more computer-readable medium of example 26, further comprising one or more instructions that when executed on the at least one processor configure the at least one processor to perform one or more operations to cause generation of the alarm or the notification after expiration of a timer.

Example 28 includes a method comprising: detecting presence or condition of one or more occupants of a vehicle based on sensor data; and storing information corresponding to one or more functions of the vehicle in memory, wherein logic circuitry transmits a request to the vehicle to cause an adjustment to the one or more functions of the vehicle based at least in part on the stored information. Example 29 includes the method of example 28, wherein the logic circuitry is coupled to a vehicle seat cover, wherein one or more sensors are coupled to the vehicle seat cover to generate the sensor data. Example 30 includes the method of example 28, wherein the logic circuitry detects presence and/or location of the one or more occupants based on a distribution of pressure exercised on a plurality of sensors, wherein the one or more sensors are located in a matrix format to generate the sensor data.

Example 31 includes an apparatus comprising means to perform a method as set forth in any preceding example. Example 31 includes machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic circuitry to detect presence or condition of one or more occupants of a vehicle based on sensor data; and
   memory to store information corresponding to one or more functions of the vehicle,
   wherein the logic circuitry is to transmit a request to the vehicle to cause an adjustment to the one or more functions of the vehicle based at least in part on the stored information, wherein the logic circuitry is coupled to a vehicle seat cover, wherein one or more sensors are coupled to the vehicle seat cover to generate the sensor data, wherein the one or more sensors are attached or embedded in a fabric of the vehicle seat cover, wherein the fabric is capable of changing color in response to contact with one or more chemicals or molecules linked to stress.

2. The apparatus of claim 1, wherein the logic circuitry is detachable from the vehicle seat cover.

3. The apparatus of claim 1, wherein the vehicle seat cover is capable of lying flat in a portion of the vehicle.

4. The apparatus of claim 1, wherein the fabric is further capable of changing color in response to at least one of contact with moisture and excessive heat.

5. The apparatus of claim 1, wherein the logic circuitry is to detect presence and/or location of the one or more occupants based on a distribution of pressure exercised on a plurality of sensors, wherein the one or more sensors are to be located in a matrix format to generate the sensor data.

6. The apparatus of claim 1, wherein the stored information comprises Controller Area Network Bus (CANBUS) information corresponding to the one or more functions of the vehicle.

7. The apparatus of claim 1, wherein the one or more functions comprise one or more of: a Heating, Ventilation, and Air Conditioning (HVAC), vent direction, fan direction, fan speed, seatbelt warning, interior lighting, or entertainment.

8. The apparatus of claim 1, wherein the logic circuitry is coupled to analog front end to receive signals from one or more sensors, wherein the one or more sensors are to generate the sensor data.

9. The apparatus of claim 1, wherein the logic circuitry is coupled to a wireless transceiver to wirelessly transmit the request to one or more components of the vehicle via a Controller Area Network Bus (CANBUS).

10. The apparatus of claim 1, wherein a smart phone is to transmit the information to the logic circuitry.

11. The apparatus of claim 1, wherein the logic circuitry is coupled to a Universal Serial Bus (USB) to communicate data and/or charge a battery coupled to the logic circuitry.

12. The apparatus of claim 1, further comprising one or more sensors to generate the sensor data.

13. The apparatus of claim 12, wherein the one or more sensors comprise one or more of: a moisture sensor, a pressure sensor, a chemical or biomolecular sensor, or temperature sensor.

14. The apparatus of claim 13, wherein the pressure sensor comprises a flexible strain sensor or an ultrasensitive pressure sensor fabricated on a flexible substrate.

15. The apparatus of claim 1, wherein the one or more sensors are attached or embedded in a non-conductive spacer foam or spacer textile of the vehicle seat cover, the spacer foam or the spacer textile coupled between an electrode array and a back electrode of the vehicle seat cover.

16. One or more non-transitory computer-readable medium comprising one or more instructions that when executed on at least one processor configure the at least one processor to perform one or more operations to:
   detect presence or condition of one or more occupants of a vehicle based on sensor data; and
   store information corresponding to one or more functions of the vehicle in memory,
   wherein the at least one processor is to transmit a request to the vehicle to cause an adjustment to the one or more functions of the vehicle based at least in part on the stored information, wherein the at least one processor is coupled to a vehicle seat cover, wherein one or more sensors are coupled to the vehicle seat cover to generate the sensor data, wherein the one or more sensors are attached or embedded in a fabric of the vehicle seat cover, wherein the fabric is capable of changing color in response to contact with one or more chemicals or molecules linked to stress.

17. The one or more non-transitory computer-readable medium of claim 16, further comprising one or more instructions that when executed on the at least one processor configure the at least one processor to perform one or more operations to cause detection of presence and/or location of the one or more occupants based on a distribution of pressure exercised on a plurality of sensors, wherein the one or more sensors are to be located in a matrix format to generate the sensor data.

18. The one or more non-transitory computer-readable medium of claim 16, further comprising one or more instructions that when executed on the at least one processor configure the at least one processor to perform one or more operations to cause generation of an alarm or a notification to indicate that the one or more occupants remain in the vehicle after vehicle shut down.

* * * * *